(12) United States Patent
Sasaki

(10) Patent No.: US 9,496,818 B2
(45) Date of Patent: Nov. 15, 2016

(54) MOTOR DRIVING APPARATUS WITH ABNORMALITY DETECTION FUNCTION
(71) Applicant: FANUC CORPORATION, Yamanashi (JP)
(72) Inventor: Taku Sasaki, Yamanashi (JP)
(73) Assignee: Fanuc Corporation, Yamanashi (JP)
( * ) Notice: Subject to any disclaimer, the term of this patent is extended or adjusted under 35 U.S.C. 154(b) by 280 days.
(21) Appl. No.: 14/221,877
(22) Filed: Mar. 21, 2014
(65) Prior Publication Data
US 2014/0285131 A1 Sep. 25, 2014
(30) Foreign Application Priority Data Mar. 22, 2013 (JP) ................. 2013-060428

(51) Int. Cl.
H02P 1/00 (2006.01)
H02P 29/00 (2016.01)
(52) U.S. Cl.
CPC ................. H02P 29/0088 (2013.01)
(58) Field of Classification Search
CPC ........... H02P 29/0088; H02P 29/0055; H02P 29/022; H02P 23/14; H02P 29/0044; H02H 5/04; H02K 11/0047
USPC ......... 318/490, 400.21, 400.22, 400.26, 722, 318/724, 434, 471, 472
See application file for complete search history.

(56) References Cited

U.S. PATENT DOCUMENTS 5,923,135 A * 7/1999 Takeda ................ B60L 11/1803
318/432
6,854,881 B2 * 2/2005 Nada ...................... B60K 6/445
324/500
7,477,530 B2 * 1/2009 Tashima ............. H05K 7/20945
361/678

(Continued)

FOREIGN PATENT DOCUMENTS

JP 2001318008 A 11/2001
JP 2003134795 A 5/2003

(Continued)

OTHER PUBLICATIONS

English Abstract and Machine Translation for Japanese Publication No. 2012-115081 published Jun. 14, 2012, 29 pgs.

(Continued)

Primary Examiner — Bentsu Ro
Assistant Examiner — Thai Dinh
(74) Attorney, Agent, or Firm — Fredrikson & Byron, P.A.

(57) ABSTRACT

The invention provides a motor driving apparatus of the invention comprises a power semiconductor device (11) for power conversion; a driving unit (12) controlling driving of the power semiconductor device (11) to supply power to a motor; a heat transmission structure (13) transferring a heat generated from the power semiconductor device (11) to a cooling medium via a heat conduction member; a temperature detection unit (14) detecting a real temperature of the heat conduction member; a current detection unit (15) detecting a current value of an output current from the power semiconductor device (11) to the motor; a temperature estimation unit (16) calculating an estimated temperature of the heat conduction member based on the output current value; and an abnormality detection unit (17) determining presence or absence of an abnormality in the heat transmission structure (13) based on a difference between the real and the estimated temperatures.

8 Claims, 6 Drawing Sheets

(56) References Cited

U.S. PATENT DOCUMENTS

| | | | | |
|---|---|---|---|---|
| 7,607,827 B2* | 10/2009 | Karikomi | ............... | G01K 7/425 361/93.8 |
| 7,839,108 B2* | 11/2010 | Patel | .................... | H02H 7/0852 318/400.01 |
| 8,319,463 B2* | 11/2012 | Sasaki | ..................... | H02M 7/48 318/400.3 |
| 8,487,575 B2* | 7/2013 | Yeh | ..................... | H02P 29/0072 318/432 |
| 8,582,335 B2* | 11/2013 | Hasegawa | ............... | B60L 3/003 363/132 |
| 8,649,931 B2* | 2/2014 | Nishizawa | ................ | F01P 5/14 701/29.1 |
| 9,090,238 B2* | 7/2015 | Kakihara | ............. | G01K 15/007 |
| 2008/0055799 A1* | 3/2008 | Serizawa | ............... | H02H 5/044 361/24 |

FOREIGN PATENT DOCUMENTS

| | | |
|---|---|---|
| JP | 2007312536 A | 11/2007 |
| JP | 20085615 A | 1/2008 |
| JP | 2010-187504 A | 8/2010 |
| JP | 201124363 A | 2/2011 |
| JP | 2011036095 A | 2/2011 |
| JP | 2012115081 A | 6/2012 |
| JP | 2012163285 A | 8/2012 |

OTHER PUBLICATIONS

English Abstract and Machine Translation for Japanese Publication No. 2008-5615 published Jan. 10, 2008, 24 pgs.

English Abstract and Machine Translation for Japanese Publication No. 2003-134795 published May 9, 2003, 22 pgs.

English Abstract for Japanese Publication No. 2001-318008 published Nov. 16, 2001, 1 pg.

English Abstract for Japanese Publication No. 2011-24363 published Feb. 3, 2011, 1 pg.

English Machine Translation for Japanese Patent Publication No. 2010-187504, published Aug. 26, 2010, 21 pages.

English Machine Translation for Japanese Publication No. 2012-163285 published Aug. 30, 2012, 26 pages.

* cited by examiner

PRIOR ART

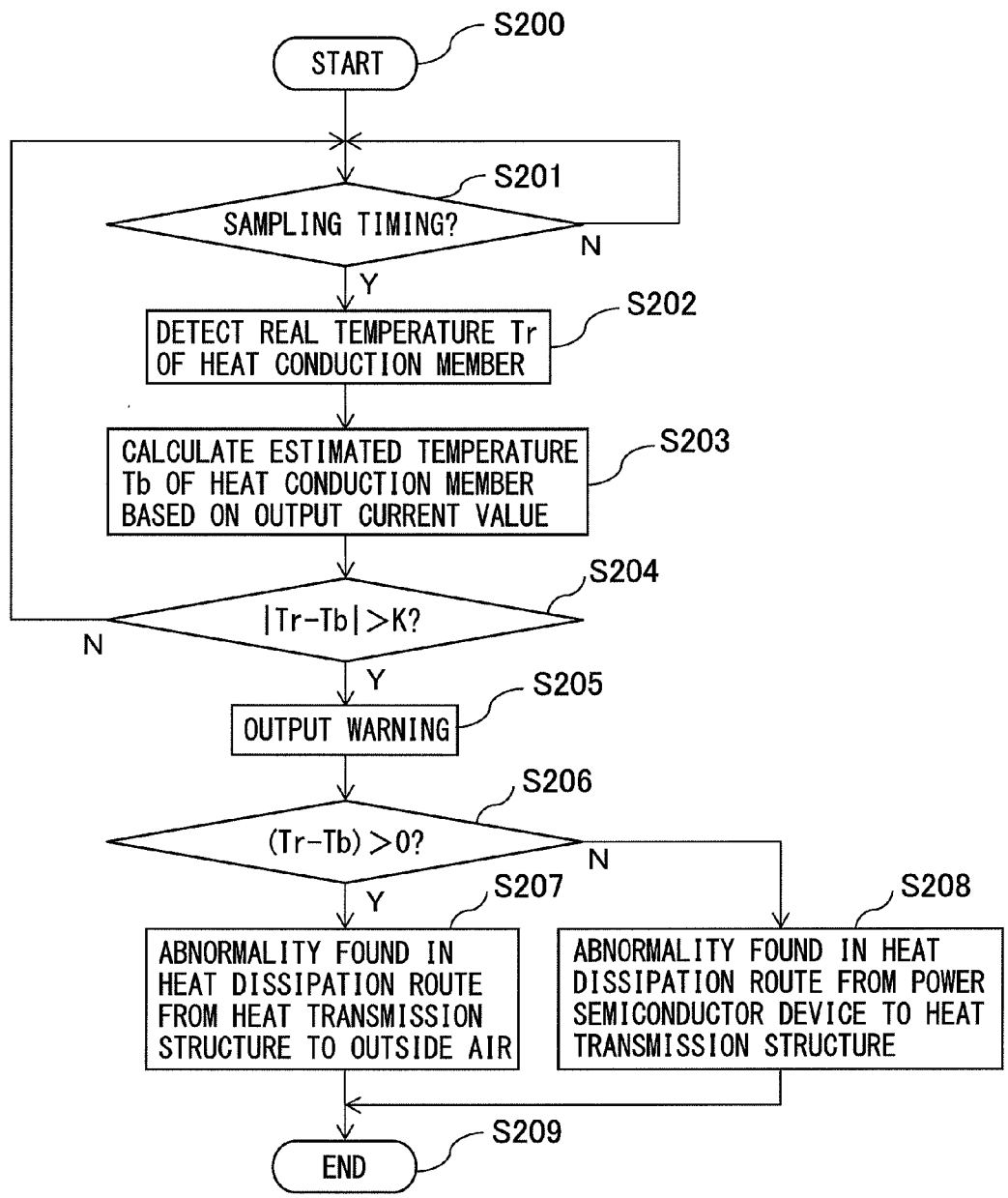

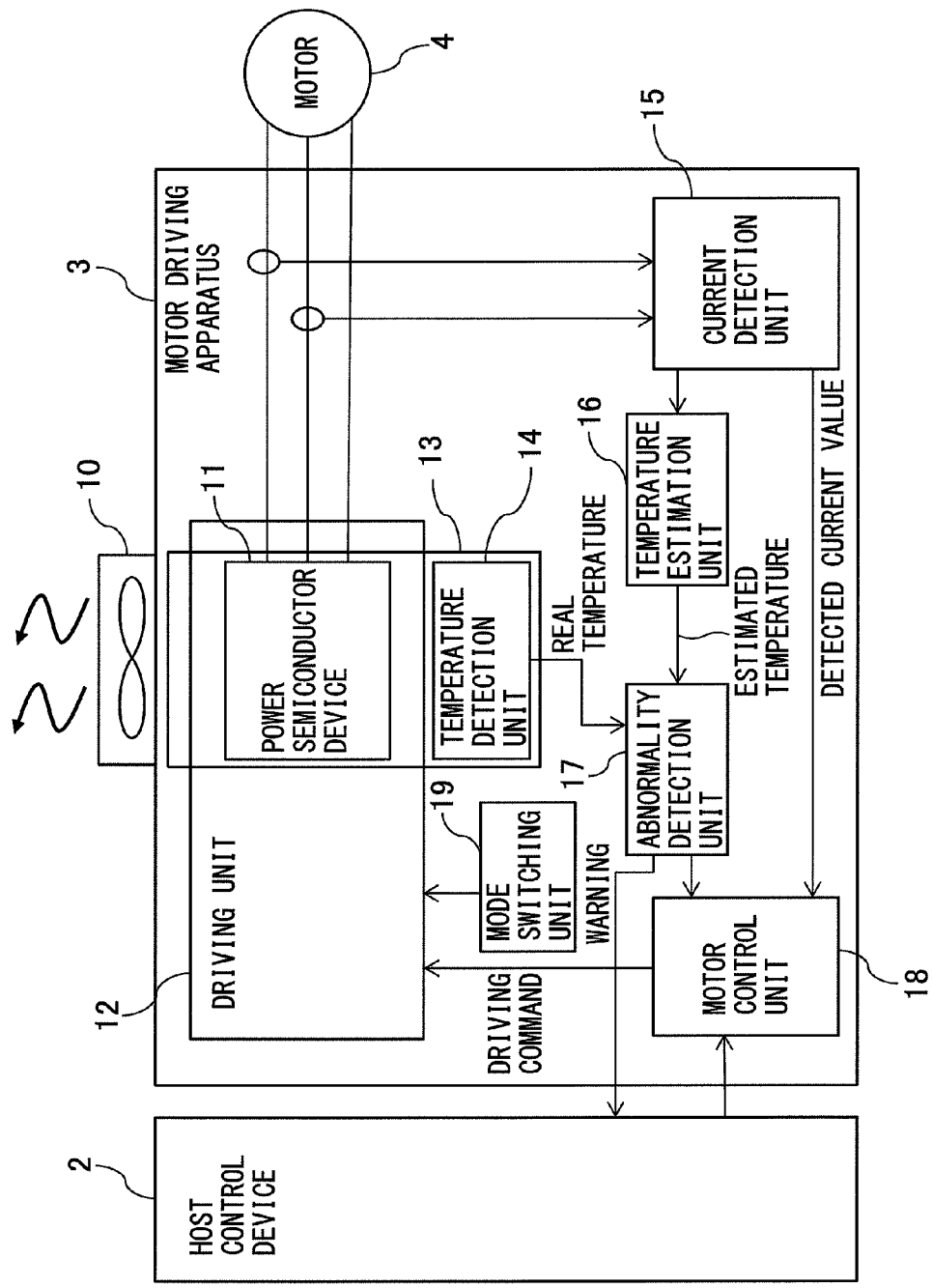

MOTOR DRIVING APPARATUS WITH ABNORMALITY DETECTION FUNCTION

CROSS-REFERENCE TO RELATED APPLICATIONS

This application is a new U.S. patent application that claims benefit of JP 2013-060428, filed on Mar. 22, 2013, the content of JP 2013-060428 is incorporated herein by reference.

FIELD OF THE INVENTION

The invention relates to a motor driving apparatus, and in particular to a motor driving apparatus having an abnormality detection function for detecting an abnormality in a heat dissipation route or in a heat dissipation related member including a radiator adapted for transferring heat generated by a power semiconductor device to outside.

BACKGROUND OF THE INVENTION

Power semiconductor devices are devices for use in power conversion from alternating current to direct current or direct current to alternating current, and are used in a motor driving apparatus configured to drive a feed shaft and a main shaft of a machine tool, and an arm of an industrial machine and an industrial robot, etc. The power semiconductor device is typically implemented in intimate contact with a radiator, etc. and configured to allow heat generated during power supply to be released to the radiator and make the heat radiate from the radiator into air by natural convection.

In some cases, the heat is efficiently radiated by the radiator to the air by creating air flow using a fan motor and thereby releasing heated air to the outside. Thus, it is possible to suppress temperature rise in the power semiconductor device and fully exploit the capability of the power semiconductor device.

However, the power semiconductor device fails to fully exploit its capability when a malfunction or an abnormality degrading heat dissipation capability occurs in a certain portion of the heat dissipation route of the above-described power semiconductor device. In addition, the power semiconductor device may be damaged when the device is kept in use despite a malfunction or abnormality.

By way of example, the following factors can be cited as possible malfunctions and abnormalities in the heat dissipation route:
(1) Low heat conductivity from a chip of the power semiconductor device to a base metal surface (which may be caused by malfunctioning of the power semiconductor device as such);
(2) Low heat conductivity between the base metal surface and the radiator (which may be caused by omission of application of silicon grease or performance deterioration of the silicon grease over time);
(3) Low heat conductivity of the radiator (which may be caused by clogging of a heat dissipation fin with dust obstructing flow of air, or a dirty surface of the heat dissipation fin degrading heat dissipation capacity).
(4) Insufficient flow of air relative to a desired amount thereof (which may be caused by an abnormality (decrease in rotation speed, stoppage, etc.) of the fan motor).

Various techniques have been proposed in the context of the detection of the above-identified malfunctions and abnormalities. With regard to the first to the third factors cited above, for example, one of the proposed techniques implements a unit adapted for detecting the temperature of the chip of the power semiconductor device and temperature of the radiator as such, and stops the motor driving apparatus when the temperature exceeds a certain specific temperature (for example, see Japanese Unexamined Patent Publication No. JP-A-2011-036095, hereinafter referred to as "Patent Literature 1").

Patent Literature 1 proposes a method of calculating the temperature of a power semiconductor device while power is supplied thereto and thus protecting the device appropriately. The method of calculating the temperature of the power semiconductor device includes obtaining a sum of a value of temperature measured at a reference point and a calculated value corresponding to the temperature rise in the power semiconductor device relative to the reference point. In the calculation of the temperature rise, thermal conduction of the power semiconductor device is modeled based on the primary delay system.

The related art described in Patent Literature 1, however, relies upon the premise that a malfunction or an abnormality is not to be found in a heat dissipation related route, and that the real temperature is correctly estimated by the calculated value of the temperature of the power semiconductor device. It is accordingly not possible to provide correct calculation and proper protection when a malfunction or an abnormality occurs in the heat dissipation route. In fact, the above related art is not capable of detecting malfunctions and abnormalities of the heat dissipation route.

In addition, the related art described in Patent Literature 1 has such problems as "increase in the cost needed to implement a temperature detection unit"; abnormality detection being only possible when the certain specific temperature has been exceeded"; and "detection of malfunction being only possible for a limited range of portions of the heat dissipation route".

With regard to the fourth factor cited above, a technique has been proposed that, for example, monitors the state of rotation of the fan motor (rotating or stopped, rotation speed, etc.) and stops the motor driving apparatus when an abnormality is found in the state of rotation. Another technique has been proposed that detects an abnormality of the state of rotation of the fan motor by monitoring a change in the temperature of the radiator while power supply to the motor is disabled (for example, see Japanese Unexamined Patent Publication No. JP-A-2007-312536, hereinafter referred to as "Patent Literature 2"). Since the fan motor is an independent component among those belonging to the heat dissipation route, malfunctions and abnormalities of the fan motor can be relatively readily detected.

Patent Literature 2 discloses an inverter apparatus that detects an abnormality of an air blowing unit such as a fan motor. FIG. 1 partly illustrates a cooling mechanism described in Patent Literature 2. A power semiconductor device module 1009 and a diode module 1007 are mounted on and in intimate contact with a heat dissipation fin 1010 serving as a heat dissipation member. A temperature sensor 1011 adapted to detect the temperature of the heat dissipation fin 1010 is provided on an upper surface of the heat dissipation fin 1010. The heat dissipation fin 1010 comprises multiple fins 1010A, and there is also provided a cooling fan 1012 such that the cooling air flows along the fins 1010A.

In the related art described in Patent Literature 2, an abnormality in the air blowing unit is detected by stopping the power supply after occurrence of a certain amount of a rise in the temperature of the heat dissipation member, and monitoring the occurrence of a subsequent fall in the temperature of the heat dissipation member. Specifically, the abnormality of the air blowing unit is detected based on a difference between a temperature fall in the disabled state and a temperature fall in the enabled state of the air blowing unit.

The above related art may be capable of detecting an abnormality in the air blowing unit (fan motor, etc.) in the heat dissipation related route. It should be noted, however, that there are problems in that an abnormality may only be detected in the air blowing unit; accurate detection is not available when a malfunction occurs in a unit for enabling/disabling the air blowing unit and a unit for detecting the temperature of the heat dissipation member; and that detection cannot be performed unless the power supply is disabled.

In the context of detection of malfunctions and abnormalities of the heat dissipation route that releases the heat generated by the power semiconductor, it has been difficult in the related art to detect "abnormalities of various components involved in heat dissipation in a cost-effective manner" and "at an early stage". It is therefore an object of the invention to readily detect malfunctions or abnormalities of the components involved in the heat dissipation route of the above-described power semiconductor device with reduced cost for the motor driving apparatus.

SUMMARY OF THE INVENTION

The invention provides a motor driving apparatus that comprises a power semiconductor device adapted for power conversion; a driving unit configured to control driving of the power semiconductor device so as to supply power to a motor; a heat transmission structure configured to transfer heat generated from the power semiconductor device to a cooling medium via a heat conduction member; a temperature detection unit configured to detect the real temperature of the heat conduction member; a current detection unit configured to detect the current value of an output current from the power semiconductor device to the motor; a temperature estimation unit configured to calculate an estimated temperature of the heat conduction member based on the output current value; and an abnormality detection unit configured to determine the presence or absence of an abnormality in the heat transmission structure based on a difference between the real temperature and the estimated temperature.

The motor driving apparatus of the invention, when compared with the related art has the following advantageous effects. First, the real temperature detection has only to be performed at a single point, so that sophisticated detection circuitry and components do not need to be additionally provided therefor. Second, the invention makes it possible to detect malfunctions and abnormalities in successive heat dissipation related routes as a whole, and thereby identify, to a certain degree, the location at which the malfunction or abnormality occurs. Third, an abnormality can be detected regardless of whether the power supply to the motor is enabled or disabled. Fourth, since the invention is capable of monitoring the process in which a normal state is lost causing a malfunction or an abnormality to occur, it is possible to generate a warning, etc. prior to stoppage of the motor driving apparatus (it is possible to avoid unnecessary halting of production due to stoppage of machine tools at a production site). Fifth, by virtue of constantly-performed comparison of the two values, a malfunction and abnormality can be immediately detected when either of the two values is found faulty or abnormal.

DESCRIPTION OF THE DRAWINGS

These and other features and advantages of the present invention will be better understood by reading the following detailed description, taken together with the drawings wherein:

FIG. 5 is a flowchart for illustration of the operation procedure of a motor driving apparatus according to a second embodiment of the invention; and FIG. 6 is a configuration diagram of a motor driving apparatus according to a third embodiment of the invention.

DETAILED DESCRIPTION OF THE PREFERRED EMBODIMENT

A motor driving apparatus according to the invention is hereinafter described with reference to the drawings. It should be noted, however, that the technical scope of the invention is not limited to the illustrated embodiments thereof, but the technical scope of the invention is defined by the claims set forth in the scope of claims and their equivalents.

First Embodiment

Figure 1:
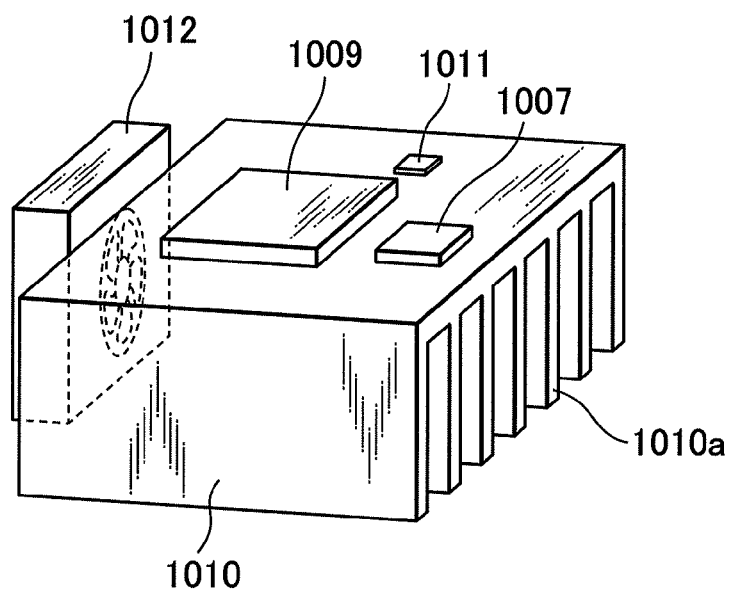
FIG. 1 is a perspective view illustrating a cooling structure of a conventional power semiconductor device.
Figure 2:
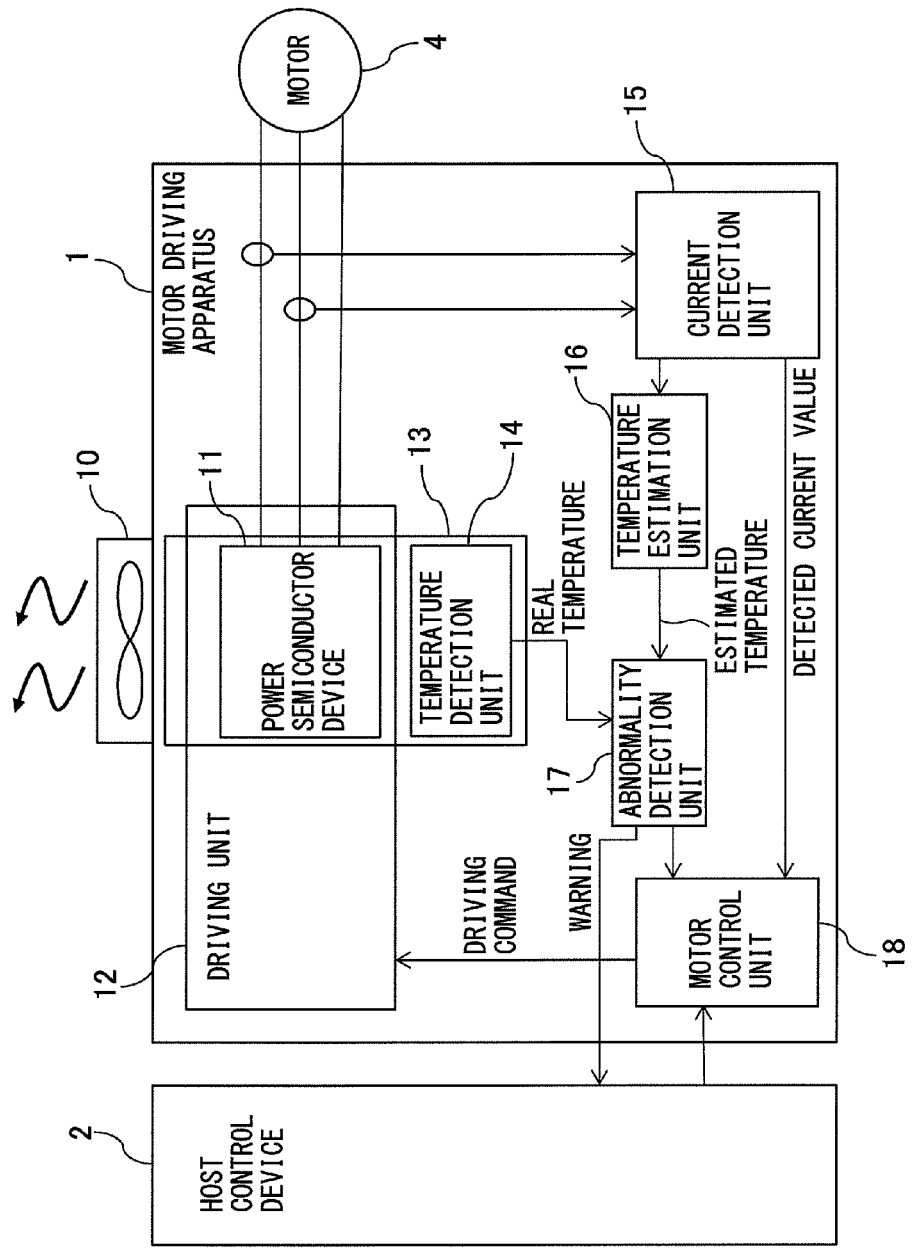
FIG. 2 is a configuration diagram of a motor driving apparatus according to a first embodiment of the invention.

FIG. 2 is a configuration diagram illustrating a motor driving apparatus according to a first embodiment of the invention. The motor driving apparatus 1 of the invention comprises a power semiconductor device 11 for power conversion; a driving unit 12 configured to control driving of the power semiconductor device 11 for supplying power to the motor 4; a heat transmission structure 13 configured to transfer heat generated by the power semiconductor device 11 to a cooling medium via a heat conduction member; a temperature detection unit 14 configured to detect the real temperature of the heat conduction member; a current detection unit 15 configured to detect the current value of an output current from the power semiconductor device 11 to the motor 4; a temperature estimation unit 16 configured to calculate an estimated temperature of the heat conduction member on the basis of the output current value; and an abnormality detection unit 17 configured to determine the presence or absence of an abnormality in the heat transmission structure 13 on the basis of a difference between the real temperature and the estimated temperature.

The abnormality detection unit 17 has a storage unit (not shown) for storing a threshold K for determination of the presence or absence of an abnormality. When the difference between the real temperature and the estimated temperature exceeds the threshold K, it is determined that an abnormality exists.

The motor driving apparatus 1, which is configured to control the operation of the motor 4, includes a motor control unit 18 that receives a warning from the abnormality detection unit 17, so that the motor control unit 18 restricts the operation of the motor 4 upon receiving the warning.

A host control device 2 is connected to the motor driving apparatus 1, and a position command or speed command may be sent from the host control device 2 to the motor control unit 18. The host control device 2 may comprise a CNC (computer numerical control) device, etc. Implementation of the warning sent to the CNC device allows for applications such as providing an abnormality indication on a display of the CNC device to notify a machine tool user. Further, another form of application may be networked abnormality monitoring for the motor driving apparatus by the CNC device.

The motor driving apparatus 1 illustrated in FIG. 2 employs a power semiconductor device such as an IGBT for use in power conversion from alternating current to direct current, or vice versa. With regard to the power semiconductor device, a chip temperature may rise due to loss occurring when power is supplied, and the power semiconductor device may be damaged when the chip temperature exceeds a specific temperature. The motor driving apparatus 1 makes the heat transmission structure 13 release the heat that has been generated by the power semiconductor device 11 for power conversion. Accordingly, of importance in the design of the motor driving apparatus 1 is how to release the heat generated by the power semiconductor device 11 and suppress a temperature rise of the power semiconductor device 11.

The following explanation is based on an exemplary case in which the heat generated in the power semiconductor device 11 is to be released to the air.

The power semiconductor device 11 may typically be implemented in intimate contact with the heat conduction member (e.g., radiator) included in the heat transmission structure 13. In this case, in order to efficiently transfer the heat to the radiator, a metal surface, which is called a base, of the power semiconductor device is implemented in intimate contact with the radiator. The base in some cases may be implemented with a substance having high thermal conductivity such as silicon grease placed between the base metal surface and the radiator so that the heat can be efficiently transferred from a contact surface therebetween.

The structure of the heat conduction member such as the radiator included in the heat transmission structure 13 may be typically defined such that its contact area with the air, i.e., its surface area, is increased (enlarged) for efficient heat release to the air. Further, more efficient heat release can be achieved by providing a fan motor 10 near the heat transmission structure 13 so that the amount of air flow through the radiator is increased.

In this manner, by virtue of efficient releasing of the heat generated in the power semiconductor device 11, it is possible to fully exploit the capability of the power semiconductor device 11 (which may specifically include the amount of current), so that the motor driving apparatus as a whole also exhibits high performance.

However, when there is a malfunction or an abnormality in the heat dissipation route, it is not possible to sufficiently release the heat from the power semiconductor device 11. As a result, a (more-than-expected) temperature rise may occur in the power semiconductor device 11, and in the worst case, the power semiconductor device 11 may be thermally damaged.

Accordingly, in addition to the above-described ingenuity in the heat dissipation design, it is also important in the context of the motor driving apparatus to detect malfunctions and abnormalities in the heat dissipation route at an early stage and with accuracy.

A temperature rise in the heat conduction member included in the heat transmission structure 13 can be calculated (estimated) from the loss generated in the power semiconductor device 11. Specifically, the value of the temperature rise, with respect to the outside air, in the heat conduction member included in the heat transmission structure 13 can be obtained by calculation according to which the generated loss in the power semiconductor device is input to a heat transfer model modelling the heat transfer from the heat transmission structure 13 to the outside air (or simply air). As the heat transfer model of the heat transfer from the heat transmission structure 13 into the outside air, a primary delay system model that employs a thermal time constant of the heat transmission structure 13 is typically used.

For example, the approximate calculation of the temperature rise $Tb$ [° C.] with respect to the outside air (air) of the heat conduction member included in the heat transmission structure 13 can be performed using the following expression (1):

$$Tb = C \times Q \times \{1 - \exp(-t/\tau)\} \quad (1)$$

where $Q$ [W] is the generated loss in the power semiconductor device 11, $C$ [° C./W] is the thermal resistance of the heat transmission structure 13, $\tau$ is the thermal time constant of the heat transmission structure 13. The constants $C$ and $\tau$ are constants that are defined in accordance with the specifications of the heat transmission structure 13. It is observed that the thermal conductivity and thermal time constant of the heat transmission structure 13 may vary according to either the case where the heat transmission structure 13 alone is employed or a case where the structure includes the fan motor 10. In either case, it suffices to use constants in accordance with the actual usage.

The generated loss $Q$ in the power semiconductor device 11 can also be obtained by approximate calculation based on the current flowing in the power semiconductor device 11, i.e., the output current from the power semiconductor device 11 to the motor 4. Specifically, it can be obtained by multiplying the output current from the power semiconductor device 11 by a specific constant that is defined in accordance with the characteristics of the power semiconductor device 11.

For instance, the approximate calculation can employ the following expression:

$$Q = I \times D \quad (2).$$

Note that $I$ [A] is the output current from the power semiconductor device 11. Further, $D$ [W/A] is a constant defined depending on the power semiconductor device 11 and serves as a constant for use in obtaining the generated loss with respect to the current flowing in the power semiconductor device 11. The detection of the output current from the power semiconductor device 11 does not require new components or circuits, and an existing current detector that is typically used in the motor current control may be used on an as-is basis.

The temperature rise of the heat conduction member included in the heat transmission structure 13 calculated (estimated) as described above is compared with the actually detected temperature rise of the heat conduction member included in the heat transmission structure 13, and malfunctions and abnormalities of the heat dissipation route of the motor driving apparatus can be detected on the basis of the result of comparison. In this connection, the determination will take place, for example, as described below.

(A) If "the change in the temperature that has been estimated (estimated temperature) is nearly equal to the change in the actual temperature that has been detected (real temperature)", then it is determined that no abnormality exists in the heat dissipation route.

(B) If "the change in the actual temperature that has been detected (real temperature) is slow (delayed) relative to the change in the temperature that has been estimated (estimated temperature)", it is determined that an abnormality exists in the heat transfer route extending from the power semiconductor device to the heat transmission structure.

(C) If "the change in the temperature that has been estimated (estimated temperature) is slow (delayed) relative to the change in the actual temperature that has been detected (real temperature)", it is determined that an abnormality exists in the heat transfer route extending from the heat transmission structure to the outside air (air).

Figure 3:
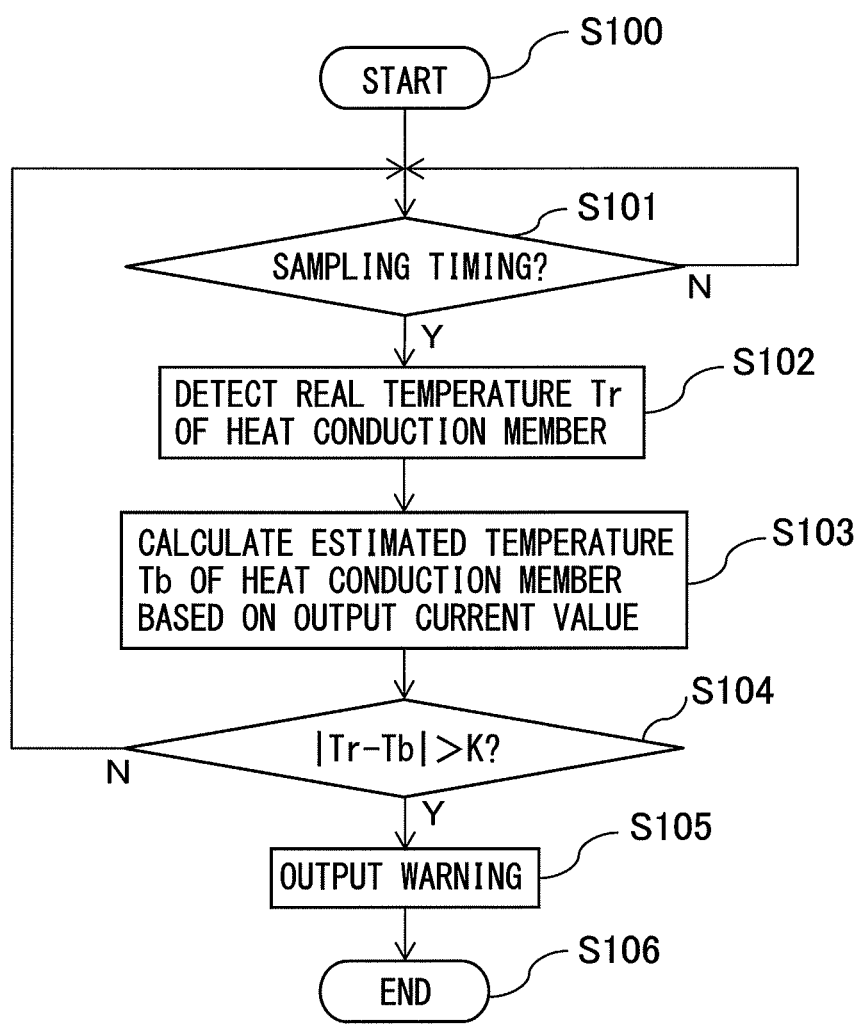
FIG. 3 is a flowchart for illustration of the operation procedure of the motor driving apparatus according to the first embodiment of the invention.

The method of detection of an abnormality in the heat transmission structure 13 is described below in further detail. FIG. 3 illustrates an exemplary process flow of the motor driving apparatus according to the first embodiment of the invention. In the process flow, Tr is the real temperature (detected value) of the heat conduction member (e.g., radiator) included in the heat transmission structure 13, Tb is the estimated temperature (calculated value) of the heat conduction member included in the heat transmission structure 13, and K is the threshold for determining whether the state is normal or abnormal.

First, in the step S101, the temperature detection unit 14 determines whether or not it is at the sampling timing for detection of the temperature of the heat conduction member included in the heat transmission structure 13. When it is determined that it is not at the sampling timing, the process returns to the step S101 and waits for the sampling timing.

On the other hand, when it is at the sampling timing, then the temperature detection unit 14 detects the real temperature Tr of the heat conduction member included in the heat transmission structure 13 in the step S102. Further, in the step S103, the temperature estimation unit 16 calculates the estimated temperature Tb of the heat conduction member included in the heat transmission structure 13 on the basis of the output current value, which has been detected by the current detection unit 15, from the power semiconductor device 11 to the motor 4.

Next, in the step S104, the abnormality detection unit 17 determines the presence or absence of the abnormality in the heat transmission structure 13 on the basis of the difference between the real temperature Tr and the estimated temperature Tb. Specifically, the presence or absence of the abnormality in the heat transmission structure 13 is determined based on whether or not the absolute value |Tr−Tb| of the difference between the real temperature Tr and the estimated temperature Tb exceeds the predetermined threshold K. If the absolute value |Tr−Tb| is equal to or less than the predetermined threshold K (|Tr−Tb|≤K), then it is determined that "no abnormality exists in the heat dissipation route", and the process returns to the step S101 to wait again for the sampling timing, so that the detection of the real temperature and the calculation of the estimated temperature are performed for the heat conduction member included in the heat transmission structure 13.

Meanwhile, if the absolute value |Tr−Tb| exceeds the predetermined threshold K (|Tr−Tb|>K), then it is determined that "an abnormality exists in the heat dissipation route", and the abnormality detection unit 17 outputs a warning to the motor control unit 18 in the step S105. The abnormality detection unit 17 may also be configured to output the warning to the host control device 2.

Figure 4:
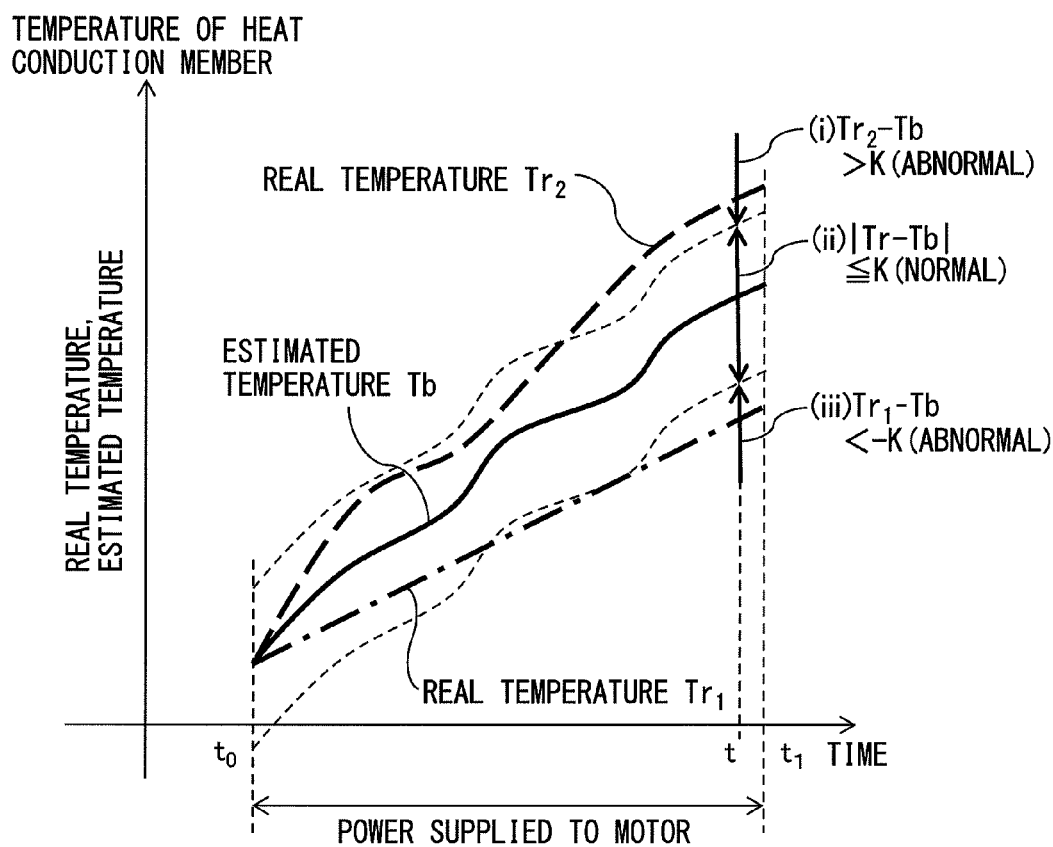
FIG. 4 is a graph for illustration of determination of the presence or absence of an abnormality based on the relationship between the real temperature and the estimated temperature of a heat transmission structure in the motor driving apparatus of the invention.

The relationship between the real temperature and the estimated temperature of the heat conduction member included in the heat transmission structure 13 is hereinafter described in further detail. FIG. 4 illustrates the variations over time of the real temperature Tr and the estimated temperature Tb of the heat conduction member included in the heat transmission structure 13 while power is supplied to the motor. It is assumed that power is supplied to the motor 4, and the motor 4 operates during the period defined by times $t_0$ and $t_1$, and that the presence or absence of the abnormality of the heat transmission structure 13 is to be detected at a certain time t (where $t_0 < t < t_1$). In the graph depicted in FIG. 4, the solid line represents the estimated temperature Tb, the dashed line and the dot-and-dash line represent the real temperature $Tr_1$ and the real temperature $Tr_2$, respectively. The dotted lines represent the upper limit and the lower limit defining the range of $-K \leq Tr-Tb \leq K$ on the basis of the predetermined threshold K, so that the region between the two dotted lines represents the range in which the heat dissipation route including the heat transmission structure 13 is in the normal state (which corresponds to a case (ii)).

As illustrated in FIG. 4, the real temperature $Tr_2$ satisfies $Tr_2-Tb > K$ at the time t (which corresponds to a case (i)), and it is determined that an abnormality exists in the heat dissipation route including the heat transmission structure 13. Meanwhile, the real temperature $Tr_1$ satisfies $Tr_1-Tb < -K$ at the time t (which corresponds to a case (iii)), and it is also determined in this case that an abnormality exists in the heat dissipation route including the heat transmission structure 13.

As described above, since the motor driving apparatus according to the first embodiment of the invention is capable of detecting the presence or absence of an abnormality of the heat dissipation route including the heat transmission structure on the basis of the real temperature of the heat conduction member included in the heat transmission structure and the estimated temperature of the heat conduction member included in the heat transmission structure calculated from the current output from the power semiconductor device, it is possible to readily detect abnormalities of the heat dissipation route including the heat transmission structure.

Second Embodiment

The following describes a motor driving apparatus according to a second embodiment. The motor driving apparatus according to the second embodiment has the same configuration as that of the motor driving apparatus according to the first embodiment.

FIG. 5 provides a flowchart for explanation of an operation procedure of the motor driving apparatus according to the second embodiment. The steps S201 to S205 are the same or similar to the steps S101 to S105 of the flowchart of FIG. 3 that have already been explained in the context of the operation procedure of the motor driving apparatus according to the first embodiment, and thus redundant explanation is omitted.

In the step S206, the abnormality detection unit 17 determines whether a value (Tr−Tb), which is obtained by subtracting the estimated temperature Tb from the real temperature Tr, is positive or negative, and a component in which an abnormality exists is identified from among the components constructing the heat transmission structure 13 on the basis of the result of this determination. Specifically, the abnormal part is identified on the basis of the magnitude relationship between the real temperature Tr, which is an output by the temperature detection unit 14, and the estimated temperature Tb, which is an output by the temperature estimation unit 16.

If "the real temperature minus the estimated temperature is larger than zero (Tr−Tb>0)", then it is determined in the step S207 that "an abnormality exists in the heat dissipation route extending from the heat transmission structure 13 to the outside air". In this case, it is indicated that the real temperature Tr of the heat transmission structure 13 has risen abnormally relative to the estimated temperature Tb. This may imply the possibility that the heat dissipation from the heat transmission structure 13 is not sufficient, because the rotation speed of the fan motor is decreased or the fan motor is stopped. Another possibility may be that the heat dissipation fin portion of the heat transmission structure 13 may be clogged with dust, hindering sufficient heat dissipation.

Meanwhile, if "the real temperature minus the estimated temperature is equal to or less than zero (Tr−Tb≤0)", then it is determined in the step S208 that "an abnormality exists in the heat dissipation route extending from the power semiconductor device 11 to the heat transmission structure 13". In this case, it is indicated that the real temperature Tr of the heat transmission structure 13 is abnormally lower than the estimated temperature Tb. This may imply the possibility of insufficient thermal conductivity of the substance residing between the base metal part of the power semiconductor device 11 and the surface of the heat transmission structure 13 (such as silicon grease), i.e., omission of application of the silicon grease, or degradation of the performance of the silicon grease due to deterioration over time. Another possibility may be malfunctioning of the power semiconductor device 11 as such.

As described above, although it is difficult to accurately locate an abnormal part, it is still possible, to a certain degree, to narrow down the possible locations of the abnormal part. From a user's point of view, the user has only to replace the malfunctioning component (e.g., radiator) by virtue of such narrowing-down feature, which allows for prompt and cost-effective maintenance.

Third Embodiment

The following describes a motor driving apparatus according to a third embodiment. FIG. 6 is a configuration diagram of the motor driving apparatus according to the third embodiment of the invention. The motor driving apparatus 3 according to the third embodiment differs from the motor driving apparatus 1 according to the first embodiment in that the apparatus 3 further comprises a mode switching unit 19 configured for switching between a normal motor driving mode and a diagnostic mode for detecting abnormalities of the heat transmission structure 13.

In the normal motor driving mode, machining of components is often underway using machine tools, etc. and it is often the case that immediate stoppage is not permissible even when an abnormality is detected. In view of this, there is further provided the mode switching unit 19, so that abnormality diagnosis is performed by making the motor operate in the diagnostic mode in a predetermined manner, for example, once at the time of turning-on of the motor driving apparatus or once a day. Thus, it is possible to promptly detect an abnormality and output the warning, and perform procedures such as replacement of the malfunctioning component. It is preferable in the diagnostic mode that the motor 4 is fed with a prescribed current.

In the above description of the embodiments, exemplary cases have been stated in which the heat generated in the power semiconductor device is dissipated to the air. However, the invention can also be applied to such constructions in which heat dissipation takes place into liquids such as water and oil. Further, in the above description, examples have been explained which focus on the temperature of the heat conduction member included in the heat transmission structure so as to determine the presence or absence of an abnormality in the heat transmission structure. However, the invention can be applied to a case focuses on the temperature of components belonging to the heat dissipation route other than the heat conduction member such as the radiator.

In addition, the above description of the embodiments includes an exemplary case in which the inverter is used as the circuit incorporating the power semiconductor in the motor driving apparatus, the inverter being configured to convert direct current into alternating current. However, the invention can be applied to an exemplary case in which the converter is used for conversion of alternating current into direct current.

What is claimed is:

1. A motor driving apparatus comprising:
   a power semiconductor device adapted for power conversion;
   a driving unit configured to control driving of the power semiconductor device so as to supply power to a motor;
   a heat transmission structure configured to transfer a heat generated from the power semiconductor device to a cooling medium via a heat conduction member;
   a temperature detection unit configured to detect a real temperature of the heat conduction member;
   a current detection unit configured to detect a current value of an output current from the power semiconductor device to the motor;
   a temperature estimation unit configured to calculate an estimated temperature of the heat conduction member based on the output current value; and
   an abnormality detection unit configured to determine presence or absence of an abnormality in the heat transmission structure based on a difference between the real temperature and the estimated temperature.

2. The motor driving apparatus according to claim 1, wherein the abnormality detection unit comprises a storage unit storing a threshold for determination of presence or absence of the abnormality, and
   the abnormality detection unit is configured to determine that the abnormality exists in the heat transmission structure when the difference between the real temperature and the estimated temperature exceeds the threshold.

3. The motor driving apparatus according to claim 1, wherein the abnormality detection unit is configured to identify a member in which the abnormality exists from among members constituting the heat transmission structure based on a result of determination of whether a value obtained by extracting the estimated temperature from the real temperature is positive or negative.

4. The motor driving apparatus according to claim 1, wherein the abnormality detection unit is configured to output a warning when detecting the abnormality.

5. The motor driving apparatus according to claim 4, wherein the abnormality detection unit is configured to send the warning to a host control device.

6. The motor driving apparatus according to claim 4 further comprising:
   a motor control unit configured to control operation of the motor and receive the warning from the abnormality detection unit,
   wherein the motor control unit being configured to restrict the operation of the motor when receiving the warning.

7. The motor driving apparatus according to claim 1 further comprising a mode switching unit configured to switch a normal motor driving mode and a diagnostic mode for detection of the abnormality of the heat transmission structure.

8. The motor driving apparatus according to claim 7, wherein a predetermined current is made to flow in the motor in the diagnostic mode.

* * * * *